(12) United States Patent
Kumar

(10) Patent No.: US 10,490,830 B2
(45) Date of Patent: Nov. 26, 2019

(54) FUEL CELL WITH OXYGEN ADSORBER AND METHOD OF USING THE SAME

(71) Applicant: Nissan North America, Inc., Franklin, TN (US)

(72) Inventor: Amod Kumar, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 176 days.

(21) Appl. No.: 15/450,221

(22) Filed: Mar. 6, 2017

(65) Prior Publication Data

US 2018/0254499 A1    Sep. 6, 2018

(51) Int. Cl.
| | |
|---|---|
| *H01M 8/04082* | (2016.01) |
| *H01M 8/04089* | (2016.01) |
| *H01M 8/0662* | (2016.01) |
| *H01M 8/04537* | (2016.01) |
| *H01M 8/04746* | (2016.01) |
| *H01M 8/1018* | (2016.01) |

(52) U.S. Cl.
CPC ... *H01M 8/04097* (2013.01); *H01M 8/04216* (2013.01); *H01M 8/04582* (2013.01); *H01M 8/04753* (2013.01); *H01M 2008/1095* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 5,175,061 A | 12/1992 | Hildebrandt et al. | |
| 2005/0008904 A1* | 1/2005 | Suppes | B60L 11/1881 429/9 |
| 2007/0298292 A1 | 12/2007 | Sinuc et al. | |

OTHER PUBLICATIONS

Hutson et al, Synthesis and Characterization of the Sorption Properties of Oxygen-Binding Cobalt Complexes Immobilized in Nanoporous Materials, 39(7) Ind. Eng. Chem. Research, 2252-2259 (Year: 2000).*

Sundberg, Jonas, et al., Oxygen chemisorption/desorption in a reversible single-crystal-to-single-crystal transformation, Chem. Sci., 2014, pp. 4017-4025, vol. 5.

* cited by examiner

*Primary Examiner* — Yoshitoshi Takeuchi
(74) *Attorney, Agent, or Firm* — Young Basile Hanlon & MacFarlane, P.C.

(57) ABSTRACT

A method for enriching the oxygen fed to a fuel cell cathode intake comprises receiving at the cathode intake an oxidant from the air, storing oxygen in an adsorber coupled to the cathode intake, and adding the stored oxygen from the adsorber to the oxidant at the cathode intake during high current density operation. A fuel cell system comprises a membrane, an anode on one side of the membrane, and a cathode, coupled to a blocking member, on a second side of the membrane. The cathode comprising an intake configured to allow an oxidant to flow through the cathode, and an outlet configured to discharge unreacted oxygen from the cathode, an adsorber, coupled to the blocking member, configured to store oxygen for adding to the oxidant flowing through the cathode intake during high current density operation.

11 Claims, 5 Drawing Sheets

FUEL CELL WITH OXYGEN ADSORBER AND METHOD OF USING THE SAME

TECHNICAL FIELD

This disclosure relates to fuel cell systems having an enriched oxygen intake at the cathode to increase the amount of oxygen transported to the active catalyst particles.

BACKGROUND

Fuel cells efficiently and electrochemically convert fuel into electric current, which may then be used to power electric circuits, such as drive systems for vehicles. A fuel cell containing a proton exchange membrane is an electrochemical device that converts chemical energy to electrical energy using, for example, hydrogen or methane as fuel and oxygen/air as oxidant.

Fuel cells have membrane electrode assemblies comprising a membrane with an anode on one side and a cathode on the other side. The cathode side of the fuel cell is fed oxidants, such as air, that includes oxygen. The oxygen is used by the fuel cell for oxygen reduction in the production of power by the fuel cell.

SUMMARY

Disclosed herein are implementations of a method for enriching the oxygen at the cathode intake of a fuel cell using oxygen added from an adsorber. Also disclosed are fuel cell systems and fuel cell stacks that include an adsorber for enriching the oxygen fed to the fuel cell cathode.

One method for enriching the oxygen feed to a fuel cell cathode intake as disclosed herein comprises receiving at the cathode intake an oxidant from the air, storing oxygen in an adsorber, and adding the stored oxygen from the adsorber to the oxidant at the cathode intake during high current density operation.

One embodiment of a fuel cell system as disclosed herein comprises a membrane, an anode on one side of the membrane, and a cathode, coupled to a blocking member, on a second side of the membrane. The cathode comprising an intake configured to allow an oxidant to flow through the cathode, and an outlet configured to discharge unreacted oxygen from the cathode, an adsorber, coupled to the blocking member, configured to store oxygen for adding to the oxidant flowing through the cathode intake during high current density operation.

Another embodiment of a fuel cell system as disclosed herein comprises a membrane, an anode on one side of the membrane, and a cathode, coupled to a blocking member, on a second side of the membrane. The cathode comprising an intake configured to allow an oxidant to flow through the cathode, and an outlet configured to discharge unreacted oxygen from the cathode, an adsorber, coupled to the blocking member, configured to store oxygen for adding to the oxidant flowing through the cathode intake during high current density operation. The adsorber is further coupled to a controller. The controller, coupled to the adsorber and the blocking member, is configured to determine current operating conditions, and control the blocking member to release the stored oxygen in the adsorber based on the determined operating conditions.

One embodiment of a fuel cell stack as disclosed herein comprises a plurality of fuel cells. Each of the plurality of fuel cells comprises a membrane, an anode on one side of the membrane, and a cathode on a second side of the membrane. The cathode comprises an intake configured to allow an oxidant to flow through the cathode, and an outlet configured to discharge unreacted oxygen from the cathode, and an adsorber configured to store oxygen for adding to the oxidant flowing through the cathode intake during high current density operation.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
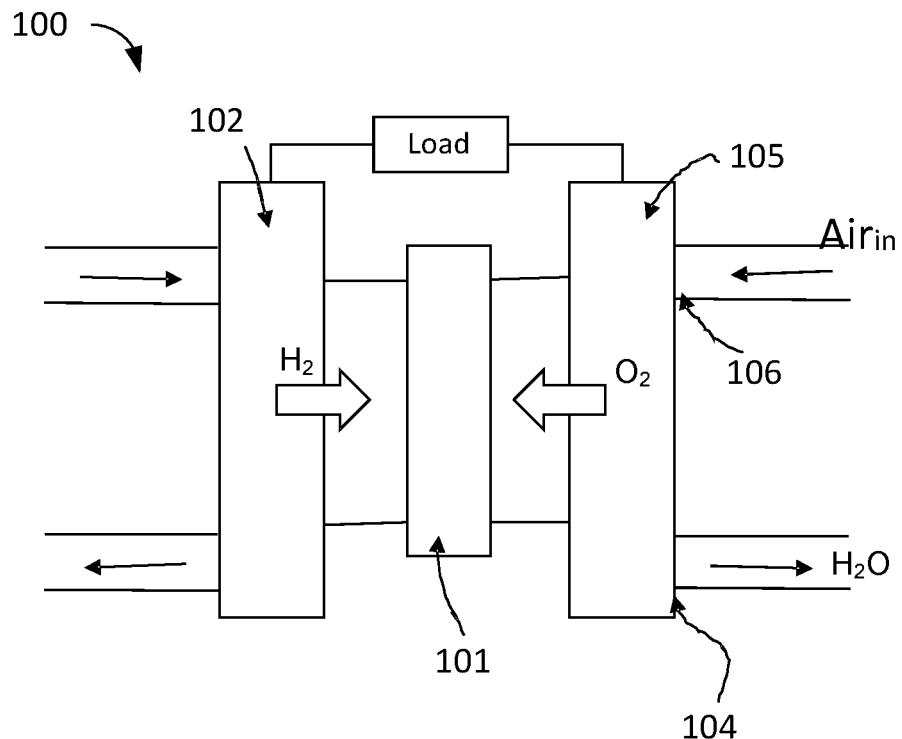
FIG. 1 is an example illustration of a fuel cell.

An example fuel cell 100 is shown in FIG. 1. The fuel cell 100 is comprised of a membrane 101, an anode 102 on one side of the membrane 101, and a cathode 105 on the other side of the membrane 101. On the anode 102 side, a catalyst enables hydrogen molecules to be split into protons and electrons. An oxidant, such as oxygen or air is fed to the cathode 105 side via a cathode intake 106. A catalyst on the cathode 105 side enables oxygen reduction by reacting with the protons generated by the anode 102, producing water that is released as exhaust by the cathode 105 through the cathode outlet 104.

Figure 2:
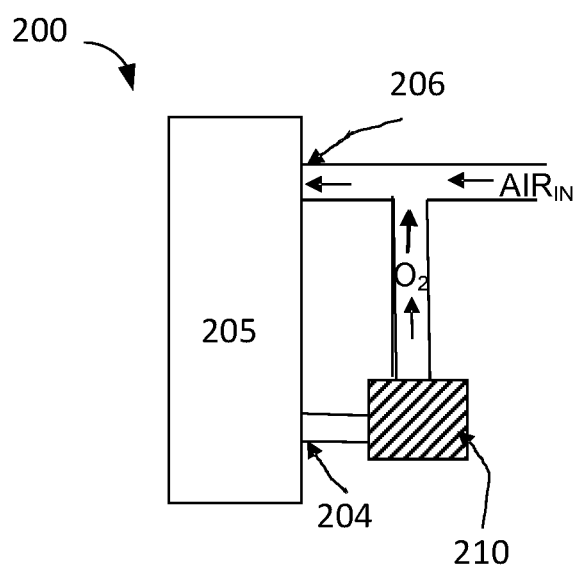
FIG. 2 is an example illustration of a fuel cell system as disclosed herein.

An implementation of a cathode side of a fuel cell system as disclosed herein is illustrated in FIG. 2. The cathode side of the fuel cell system 200 comprises a cathode 205 and an adsorber 210. As described above, the cathode 205 includes a cathode intake 206 and a cathode outlet 204. The elements of the cathode 205 operate the same as the elements of the cathode 105 shown in FIG. 1. An oxidant, e.g., air (having a volume of $O_2$ of 21%), is fed into the cathode intake 206, oxygen reduction occurs and exhaust is released from the cathode 205 via the cathode outlet 204 in the form of water ($H_2O$).

In the disclosed implementation, an adsorber 210, coupled to the cathode outlet 204 and the cathode intake 206, is configured to adsorb the unreacted oxygen released from the cathode 205. The adsorber 210 is an oxygen adsorbing/de-adsorbing compound. For example, the adsorber 210 may be made of crystalline salts of cobalt complexes. Other adsorbing compounds may be used in the alternative, for example, graphene, activated carbon, and carbon nanotubes.

Oxygen stored in the adsorber 210 is de-adsorbed by heating the adsorber compound or using pressure. Deadsorption of oxygen by the material of the adsorber may be exhibited at temperatures from 60-100° C., for example. As operating conditions of the fuel cell change, the operation of the adsorber changes. For example, as the current density of the fuel cell increases from low to high, the adsorber 210 de-adsorbs the oxygen stored in the adsorber 210. As an example, a fuel cell included in an automobile may require high power during rapid acceleration, e.g., the acceleration pedal at 80% to the floor and more, and when the automobile is driving at a high rate of speed. The adsorber may be used to provide extra oxygen to the fuel cell during these conditions. It is noted that what is considered high power conditions for the fuel cell is dependent of the system design and requirements of the user, for example. During high current density operation, the adsorber 210, further coupled to the cathode intake 206, de-adsorbs the stored oxygen therein and releases the oxygen to be added to the cathode intake 206.

It is noted that flow rates of the exhaust stream from the cathode outlet will be lower than the feed flow rates of the cathode intake depending on the rate of consumption of the oxygen in the fuel cell. Adsorber materials may adsorb up to 6%-7% of the adsorber materials weight. For example, the adsorber may be able to adsorb as much as 7 g of oxygen from the air coming out of the cathode outlet.

Figure 3:
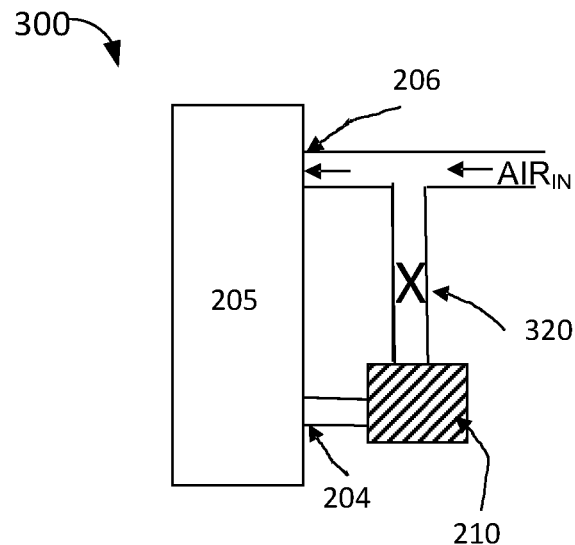
FIG. 3 is an example illustration of a second embodiment of a fuel cell system as disclosed herein.

A blocking element 320 may also be included in the fuel cell system 300. An implementation of the blocking element in the fuel system is shown in FIG. 3. The elements of the fuel system 300 shown in FIG. 3 are the same as the elements shown in FIG. 2. The blocking element 320, coupled to the cathode intake 206 and the adsorber 210, prevents de-adsorbed oxygen from the adsorber 210 from being added to the oxidant fed to the cathode intake 206. The blocking element 320 may be any element, such as a valve, that can be opened and closed to allow and prevent, respectively, the oxygen de-adsorbed by the adsorber 210. When the blocking element 320 is open, the blocking element releases the de-adsorbed oxygen from the adsorber 210 to be added to the oxygen fed to the cathode intake 206. When the blocking element 320 is closed, any de-adsorbed oxygen from the adsorber 210 is prevented from being added to the oxidants fed to the cathode intake 206.

Figure 4:
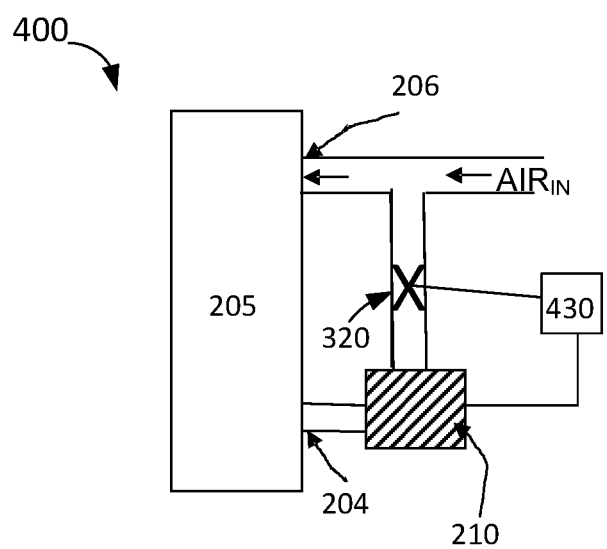
FIG. 4 is an example illustration of a third embodiment of a fuel cell system as disclosed herein.

In another embodiment of the fuel cell system 400 shown in FIG. 4, the elements are the same as those shown in FIG. 3. The cathode side of the fuel cell system 400 comprises a cathode 205, a blocking element 320, an adsorber 210 and a controller 430. The controller 430, coupled to the blocking element 320 and the adsorber 310, is configured to determine the current operating conditions of the fuel cell 400 and control the blocking element 320 based on the determined conditions. For example, the controller 430 may determine that the operation conditions require the fuel cell to operate at a high current density, and therefore, additional oxygen is needed to be fed to the cathode 206. The controller 430 signals the blocking element 320 to open and allow the de-adsorbed oxygen from the adsorber 210 to be added to the oxygen fed into the cathode intake 206.

When operating conditions are determined by the controller 430 to require the fuel cell to operate at low current density, the controller 430 signals to the blocking element to close/remain closed, thereby preventing any de-adsorbed oxygen stored in the adsorber 210 from being added to the oxygen fed to the cathode intake 206.

Figure 5:
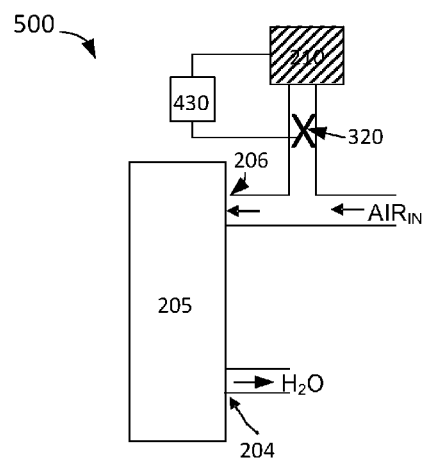
FIG. 5 is an example illustration of a third embodiment of a fuel cell system as disclosed herein.

In the embodiment of the fuel cell system 500 shown in FIG. 5, the elements are the same as those shown in FIG. 4 except that the adsorber 210 adsorbs oxygen from an oxygen source, for example, the air or an air pre-treater, and is therefore not coupled to the cathode outlet 204. The operation of each element though is the same as disclosed above. The controller 430 signals the blocking element 320 to open/close the blocking element 320 based on the operating conditions required for the fuel cell 500. When the conditions of the fuel cell 500 are determined to require high current density, the blocking element 320 opens and allows the stored oxygen adsorbed from the air to be de-adsorbed and added to the cathode intake 206 to enrich the oxidant fed to the cathode intake 320. During determined low current density conditions, the blocking element 320 is closed/remains closed to prevent de-adsorbed oxygen from being added to the oxidant fed to the cathode intake 206.

Figure 6:
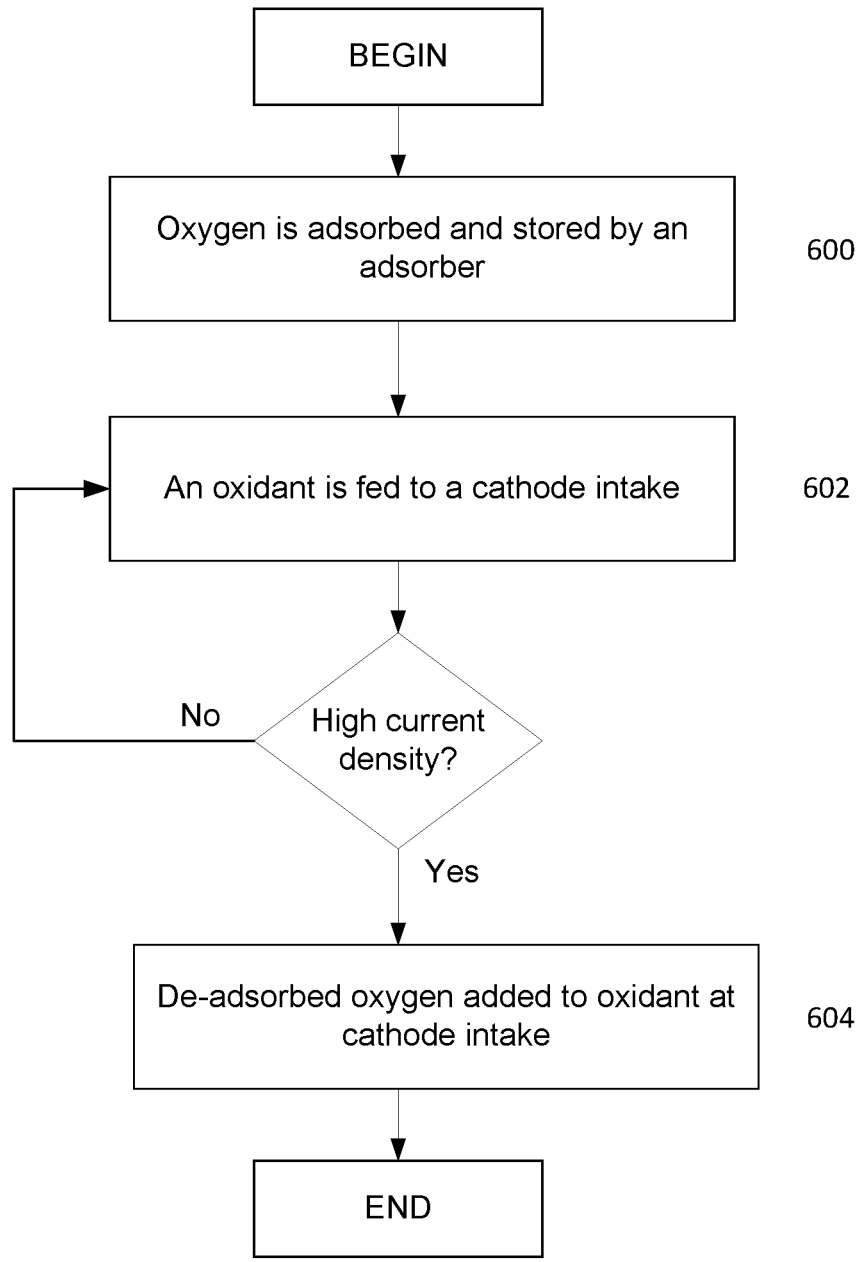
FIG. 6 is an example flow diagram of a method for enriching the oxygen fed into a fuel cell system as disclosed herein.

FIG. 6 is an example flow diagram of a method for enriching the oxidant fed to a fuel cell. Oxygen is adsorbed and stored by an adsorber coupled to a cathode intake of the fuel cell (600). An oxidant is fed to the cathode intake of the fuel cell (602). During high current density operation of the fuel cell, causing the adsorber to heat up, adding de-adsorbed oxygen from the adsorber to the oxidant fed to the cathode intake (604).

Figure 7:
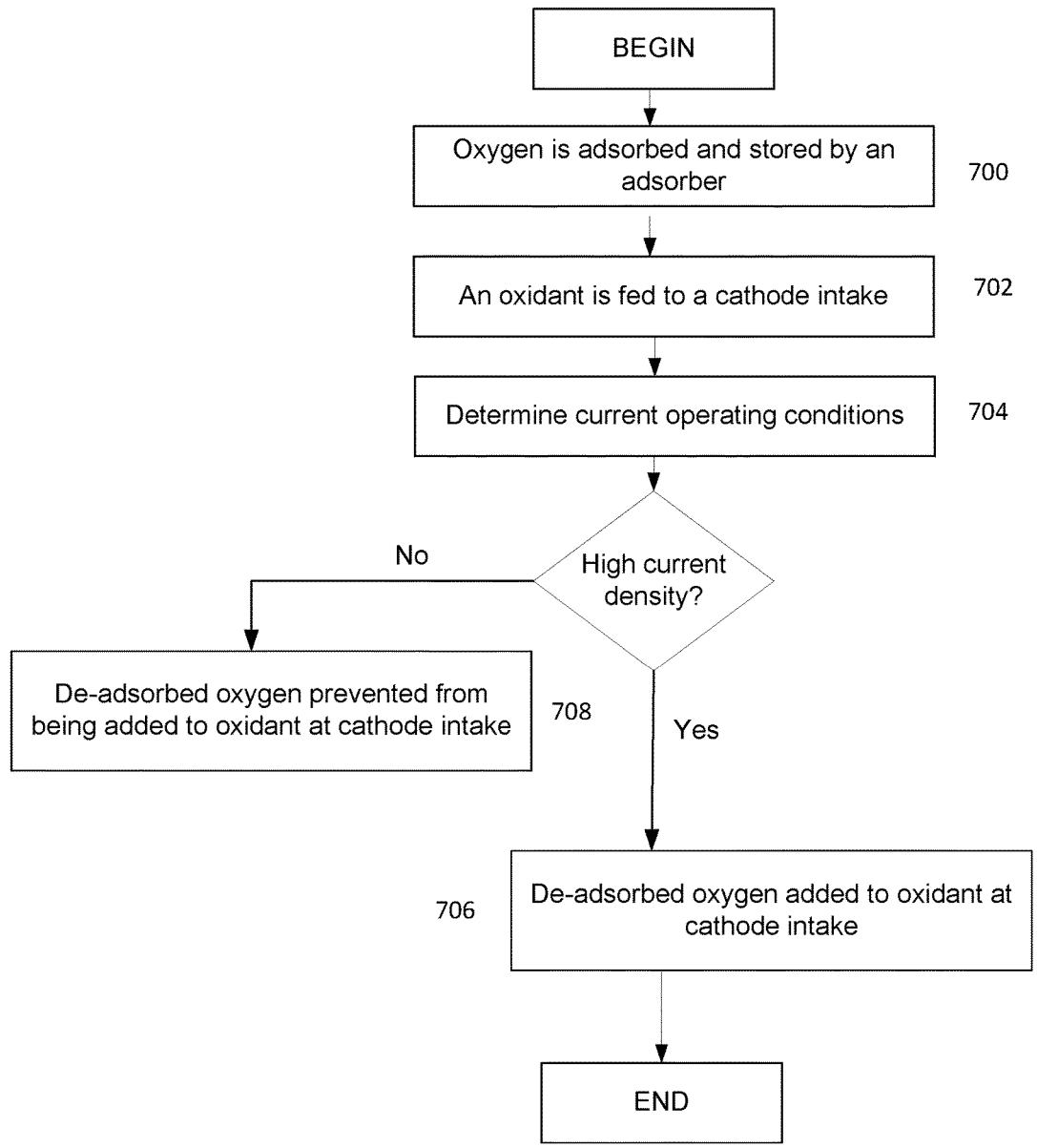
FIG. 7 is an example flow diagram of another embodiment of a method for enriching the oxidant fed to a fuel cell as disclosed herein.

FIG. 7 is an example flow diagram of another embodiment of a method for enriching the oxidant fed to a fuel cell as disclosed herein. Oxygen is adsorbed and stored by an adsorber coupled to a cathode intake of the fuel cell (700). An oxidant is fed to the cathode intake of the fuel cell (702). The current operating conditions of the fuel cell are determined by a controller (704). If the controller determines that the fuel cell is operating at high current density, an open signal is sent to a blocking element to allow de-adsorbed oxygen to be added to the oxidant being fed to the cathode intake (706).

If the controller determines that the fuel cell is operating at low current density, a closed signal is sent to the blocking element to prevent de-adsorbed oxygen from being added to the oxidant fed to the cathode intake (708).

Figure 8:
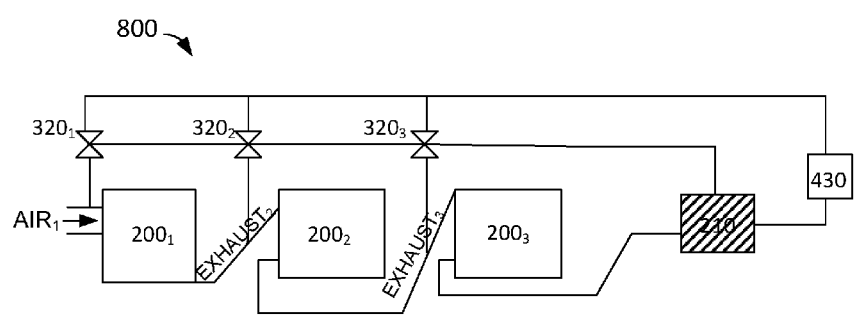
FIG. 8 is an example illustration of a fuel cell stack system as disclosed herein.

In an embodiment of a fuel cell stack system 800 shown in FIG. 8, the elements of each of the plurality of fuel cells 200 are the same as those shown in FIG. 5. The fuel cell stack system 800 comprises a plurality of fuel cells $200_1$, $200_2$, $200_3$, a plurality of blocking elements $320_1$, $320_2$, $320_3$, one or more adsorbers 210, and a controller 430. Each of the plurality of blocking elements $320_1$, $320_2$, $320_3$ is coupled to a respective cathode intake of a respective one of the plurality of fuel cells $200_1$, $200_2$, $200_3$. Each blocking element $320_1$, $320_2$, $320_3$ is also coupled to the one or more adsorbers 210 and the controller 430. The operation of the controller 430 in this embodiment is the same as described above, except that the controller 430 selectively operates each of the plurality of blocking elements $320_1$, $320_2$, $320_3$ based on the determined operation conditions and the operating conditions of each fuel cell $200_1$, $200_2$, $200_3$ in the fuel stack system 800.

For example, if the controller 430 determines that the operating conditions require at least one of the fuel cells $200_1$, $200_2$, $200_3$ in the fuel stack 800 to operate at high current density, the controller 430 selects one or more of the plurality of fuel cells $200_1$, and $200_2$, for example. In accordance with the selection of the fuel cells $200_1$, $200_2$ by the controller 430, an open signal is sent to the respective blocking elements $320_1$, $320_2$ coupled to the selected fuel cells $200_1$, $200_2$. The respective blocking elements $320_1$, $320_2$ are opened and de-adsorbed oxygen from the adsorber 210 is added to the oxidant fed to each respective cathode intakes of the selected fuel cells $200_1$, $200_2$.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A fuel cell system, comprising:
   a fuel cell, comprising:
      a membrane;
      an anode on one side of the membrane; and
      a cathode on a second side of the membrane, the cathode comprising:
         an intake line configured to allow an oxidant to flow through the cathode wherein the oxidant is air; and
         an outlet line configured to discharge unreacted oxidant from the cathode;
   an adsorber configured to:
      receive the unreacted oxidant directly from the outlet line;
      adsorb oxygen from the unreacted oxidant;
      store the adsorbed oxygen; and
      provide the adsorbed oxygen directly to the intake line via an adsorber discharge line when needed; and
   a valve positioned in the adsorber discharge line for adding to the oxidant flowing through the cathode intake during high current density operation.

2. The fuel cell system of claim 1, wherein the valve opens to release the stored oxygen from the adsorber to the cathode intake line during high current density operation.

3. The fuel cell system of claim 2, wherein the valve blocks the stored oxygen in the adsorber from the cathode intake line during low current density operation.

4. The fuel cell system of claim 3, further comprising a controller, configured to:
   determine current operating conditions; and
   control the valve to release the stored oxygen in the adsorber based on the determined operating conditions.

5. The fuel cell system of claim 2, wherein the adsorber is an oxygen adsorbing material.

6. The fuel cell system of claim 2, wherein the adsorber is a compound made of crystalline salts of cobalt complexes.

7. The fuel cell system of claim 1, further comprising:
   a plurality of fuel cells, wherein
   the adsorber feeds to each cathode intake line of each of the plurality of fuel cells via a respective valve.

8. The fuel cell system of claim 7, further comprising a controller, configured to:
   determine current operating conditions of each of the plurality of fuel cells; and
   individually control each valve to release of the stored oxygen in the adsorber to each of the plurality of fuel cells based on the determined operating conditions.

9. The fuel cell system of claim 8, wherein the adsorber receives the unreacted oxidant from each cathode outlet line of the plurality of fuel cells and is configured to:
   store oxygen from the unreacted oxidant of each cathode of the plurality of fuel cells, and
   release the stored oxygen to each cathode of the plurality of fuel cells based on the determined operating conditions.

10. The fuel cell stack of claim 8, wherein the adsorber is an oxygen adsorbing material.

11. The fuel cell stack of claim 8, wherein the adsorber is a compound made of crystalline salts of cobalt complexes.

* * * * *